(12) United States Patent
Choi et al.

(10) Patent No.: US 11,142,085 B2
(45) Date of Patent: Oct. 12, 2021

(54) BATTERY-TO-VEHICLE CHARGING SYSTEM

(71) Applicants: HYUNDAI MOTOR COMPANY, Seoul (KR); KIA MOTORS CORPORATION, Seoul (KR)

(72) Inventors: Jae Hyuk Choi, Seoul (KR); Byeong Seob Song, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 141 days.

(21) Appl. No.: 16/659,973

(22) Filed: Oct. 22, 2019

(65) Prior Publication Data

US 2020/0331355 A1    Oct. 22, 2020

(30) Foreign Application Priority Data

Apr. 18, 2019    (KR) .................. 10-2019-0045717

(51) Int. Cl.
*B60L 53/22* (2019.01)
*H02J 7/00* (2006.01)
(Continued)

(52) U.S. Cl.
CPC .............. *B60L 53/22* (2019.02); *H02J 7/342* (2020.01); *H02M 1/4225* (2013.01);
(Continued)

(58) Field of Classification Search
CPC .. B60L 53/22; B60L 2210/20; B60L 2210/14; H02J 7/0054; H02J 2207/0059; H02M 1/4225
(Continued)

(56) References Cited

U.S. PATENT DOCUMENTS 5,283,513 A * 2/1994 Fujita et al. .............. H02J 7/02
320/138
6,222,746 B1 * 4/2001 Kim .................... H02M 1/4225
363/89
(Continued)

FOREIGN PATENT DOCUMENTS

KR    10-2015-0047767 A    5/2015
KR    10-2016-0013651 A    2/2016
KR       10-1852118 B1    4/2018

OTHER PUBLICATIONS

Extended European Search Report dated May 13, 2020 issued in European Patent Application No. 19204235.6.

*Primary Examiner* — Sun J Lin
(74) *Attorney, Agent, or Firm* — Morgan, Lewis & Bockius LLP

(57) ABSTRACT

A battery-to-vehicle charging system includes: a vehicle including an on-board charger including a power factor correction circuit having a boost converter circuit, a first battery that is charged with a charge voltage output from the on-board charger, and a first controller controlling a charge process based on a type of a charge power source provided from the outside; and a mobile energy storage device including a second battery storing a direct current (DC) charge power to be provided to the first battery, and a second controller providing a determination signal for the type of the charge power source to the first controller, in which when the first controller receives the determination signal from the second controller and the charge power source is determined as a mobile energy storage device, the first controller controls the power factor correction circuit to operate as a boost converter.

7 Claims, 3 Drawing Sheets

(51) Int. Cl.
*H02M 1/42* (2007.01)
*H02J 7/34* (2006.01)

(52) U.S. Cl.
CPC ....... *B60L 2210/14* (2013.01); *B60L 2210/20* (2013.01); *H02J 2207/20* (2020.01)

(58) Field of Classification Search
USPC ........................................................ 320/104
See application file for complete search history.

(56) References Cited

U.S. PATENT DOCUMENTS

| | | | |
|---|---|---|---|
| 9,266,438 B2 * | 2/2016 | Power et al. | B60L 58/24 |
| 9,601,861 B2 * | 3/2017 | Kanamori | H01R 13/4532 |
| 9,937,817 B2 * | 4/2018 | Niwa et al. | B60L 53/24 |
| 10,124,753 B2 | 11/2018 | Bouchez et al. | |
| 10,471,836 B2 * | 11/2019 | Yabuuchi | H01M 10/48 |
| 10,479,218 B2 * | 11/2019 | Lee et al. | B60L 15/007 |
| 2013/0175973 A1 | 7/2013 | Jones et al. | |
| 2016/0347302 A1 | 12/2016 | Niwa et al. | |
| 2018/0229618 A1 | 8/2018 | Lee et al. | |

* cited by examiner

BATTERY-TO-VEHICLE CHARGING SYSTEM

CROSS REFERENCE TO RELATED APPLICATION

The present application claims the benefit of priority to Korean Patent Application No. 10-2019-0045717, filed on Apr. 18, 2019 in the Korean Intellectual Property Office, the entire contents of which is incorporated herein by reference.

TECHNICAL FIELD

The present disclosure relate to a battery-to-vehicle charging system and, more particularly, a battery-to-vehicle charging system that can charge a battery in a vehicle by supplying DC power to the vehicle from a battery of an external charging device even though there is no separate power conversion device in the external charging device.

BACKGROUND

A mobile charging system is a system for users of electric vehicles to more conveniently solve a problem of an insufficient battery level and charge batteries. A mobile charging system includes a battery that is an energy storage device for storing electrical energy and a power conversion device that converts the energy stored in the battery into the rate required by vehicles.

Since such a mobile charging system of the related art includes not only a battery for storing electrical energy, but a power conversion device having large volume and weight, the entire size and weight are large. Accordingly, there is a problem that the convenience for mobility or portability is low, so the mobile charging system can be operated only in the type of an exclusive charging service vehicle.

The description provided above as a related art of the present disclosure is just for helping understanding the background of the present disclosure and should not be construed as being included in the related art known by those skilled in the art.

SUMMARY

An aspect of the present disclosure is to provide a battery-to-vehicle charging system that can charge a battery in a vehicle by providing AC power directly supplied from a battery of an external charging device without a separate power conversion device to the battery in the vehicle.

According to one aspect of the present disclosure, a battery-to-vehicle charging system includes: a vehicle including an on-board charger including a boost converter circuit, a first battery that is charged with a charge voltage output from the on-board charger, and a first controller controlling a charge process on the basis of a type of a charge power source provided from outside; and an energy storage device including a second battery storing DC charge power provided to the first battery, and a second controller providing a determination signal for the type of the charge power source to the first controller, in which when the first controller receives the determination signal from the second controller and the charge power source is determined as the energy storage device, the first controller controls the boost converter circuit to operate.

According to an exemplary embodiment of the present disclosure, the energy storage device may not include a power conversion device for converting voltage of the second battery into voltage having magnitude that can charge the first battery.

According to an exemplary embodiment of the present disclosure, when the charge power source is determined as the energy storage device by the determination signal, the first controller may apply charge power, which is provided from the energy storage device, to an input terminal of the boost converter circuit.

According to an exemplary embodiment of the present disclosure, when the first controller receives the determination signal in power line communication through a control pilot line from the second controller and the charge power source is determined as the energy storage device, the first controller may apply charge power, which is provided from the energy storage device, to an input terminal of the boost converter circuit.

According to an exemplary embodiment of the present disclosure, the boost converter circuit may have a boost converter topology including an inductor, a diode, and a switching device, and when the first controller determines the charge power source as the energy storage device, a duty of the switching device may be determined on the basis of a ratio of voltage of the second battery and target voltage of an output terminal of the boost converter circuit.

According to an exemplary embodiment of the present disclosure, the on-board charger may further include a DC converter that converts magnitude of output voltage of the boost converter circuit into predetermined magnitude of the charge voltage.

According to another aspect of the present disclosure, a battery-to-vehicle charging system includes: a charging inlet having a plurality of terminals to which a connect of an external charge power source is coupled, to which charge power is applied from the connector, and to which a control signal for charging is provided; an on-board charger including a power factor correction circuit that has an input terminal connected to an AC power input terminal of the charging inlet and has a boot converter topology; a battery that is charged with a charge voltage output from the on-board charger; and a controller determining a type of the charge power on the basis of a control signal input from the external charge power source through a terminal of the charging inlet, and controlling a charge process on the basis of the determined type of the charge power source, in which the controller controls the power factor correction circuit to operate as a boost converter when the determined charge power source is determined as a charge power source that providing DC power of voltage lower than voltage of the battery to the AC power input terminal.

According to an exemplary embodiment of the present disclosure, the controller may determine the type of the charge power source on the basis of a control signal input through a control pilot line formed by coupling the connector to the charging inlet.

According to an exemplary embodiment of the present disclosure, the controller may receive a control signal in power line communication through a control pilot line formed by coupling the connector to the charging inlet.

According to an exemplary embodiment of the present disclosure, the controller may electrically connect the DC power input terminal to the battery without operating the on-board charger when the determined charge power source is determined as a charge power source that provides DC power higher than voltage of the battery to a DC power input terminal of the charging inlet.

According to an exemplary embodiment of the present disclosure, the power factor correction circuit may have a boost converter topology including an inductor, a diode, and a switching device, and the controller may determine a duty of the switching device on the basis of a ratio of voltage of the charge power source and target voltage of an output terminal of the power factor correction circuit when the determined charge power source is determined as a charge power source that provides DC power of voltage lower than voltage of the battery to the AC power input terminal.

According to an exemplary embodiment of the present disclosure, the power factor correction circuit may have a boost converter topology including an inductor, a diode, and a switching device, and the controller may determine a duty of the switching device by performing voltage control and current control such that voltage of the power factor correction circuit becomes target voltage when the determined charge power source is a charge power source that provides AC power to the AC power input terminal.

According to the above exemplary embodiments of the battery-to-vehicle charging system, it is possible to charge a high-voltage battery in a vehicle from a low-voltage battery using a charging connector that has been used in the related art. In particular, even though there is no separate power conversion device for increasing voltage in an external energy storage device having a low-voltage battery, it is possible to perform charging by increasing the voltage of the low-voltage battery and then applying the voltage to the battery in a vehicle using a power factor correction circuit of an OBC mounted in the vehicle.

Therefore, it is possible to reduce the size and weight of a mobile energy storage device for charging the battery in a vehicle, decrease the price of the energy storage device, and improve usability of the mobile energy storage device.

The effects of the present disclosure are not limited to the effects described above and other effects can be clearly understood by those skilled in the art from the following description.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereafter, a battery-to-vehicle charging system according to an exemplary embodiment of the present disclosure is described hereafter in detail with reference to the accompanying drawings.

In the following description, the battery-to-vehicle charging system may be referred to as a B2V (Battery-to-Vehicle) charging system that is generally used as an abbreviation in this field.

Figure 1:
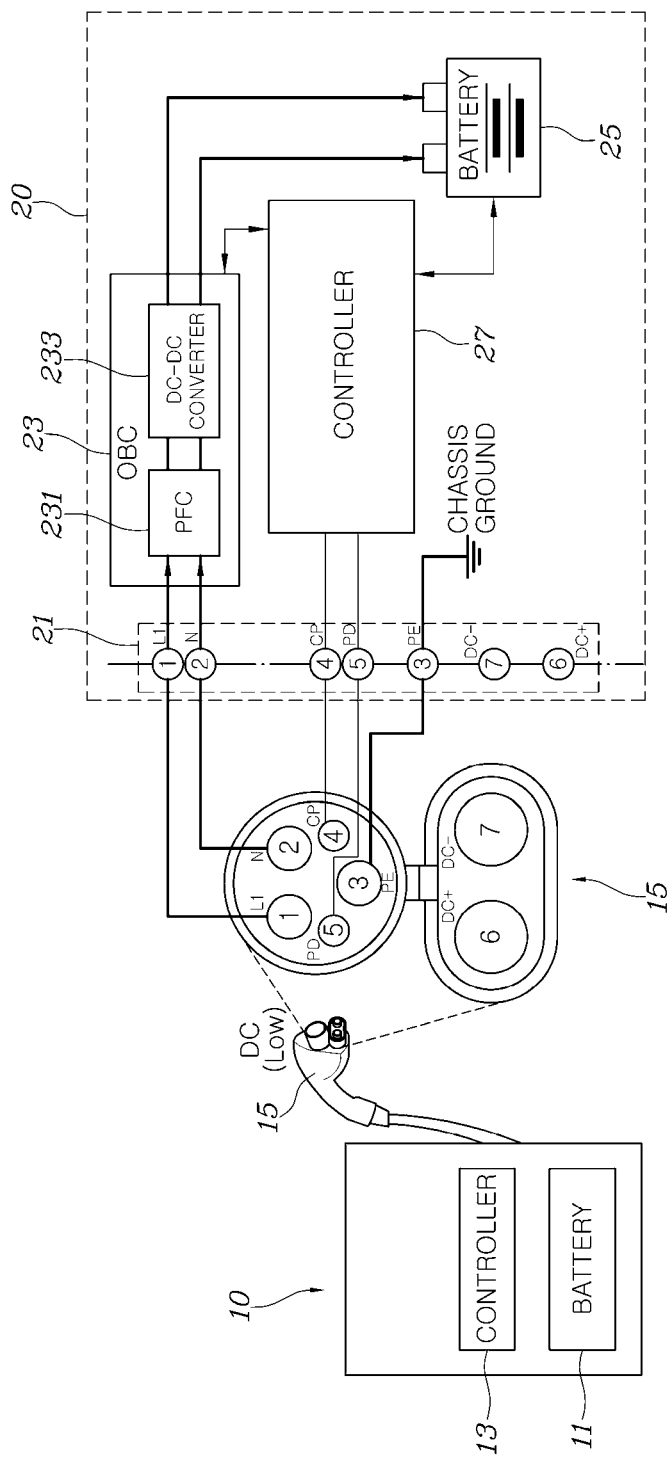
FIG. 1 is a block diagram showing the configuration of a battery-to-vehicle charging system according to an exemplary embodiment of the present disclosure.

FIG. 1 is a block diagram showing the configuration of a battery-to-vehicle charging system according to an exemplary embodiment of the present disclosure.

Referring to FIG. 1, a B2V charging system according to an exemplary embodiment of the present disclosure may include a vehicle 20 having a battery 25 that is the charge target, and an energy storage device 10 that is a type of mobile charging devices having another battery 11 storing energy for providing DC charge power to the battery 25 from the outside of the vehicle 20.

The energy storage device 10 may include the battery 11 storing charge energy, a controller 13 for performing necessary control when the energy stored in the battery 11 is supplied to the vehicle, and a charging connector 15 that is coupled to a charging inlet 21 of the vehicle.

The controller 13 of the energy storage device 10 according to an exemplary embodiment of the present disclosure may be a processor (e.g., computer, microprocessor, CPU, ASIC, circuitry, logic circuits etc.). The controller 13 may be implemented by a non-transitory memory storing, e.g., a program(s), software instructions reproducing algorithms, etc., which, when executed, controls operations of the energy storage device 10, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The energy storage device 10, which is a concept generally designate a fixed energy storage device and a mobile energy storage device, may be a device that supplies energy without having or using a separate power conversion device.

The battery 11 may be a part that stores electrical energy for charging the battery 25 in a vehicle. In general, the battery 11 included in the energy storage device 10 may have a limit in capacity of energy, which can be stored, and output voltage. Recently, as the battery 25 that supplies energy in a vehicle to drive the vehicle, batteries that output high voltage (e.g., about 800V) have been introduced, but the battery 11 included in the energy storage device 10 has difficulty in outputting voltage as high as the voltage of the battery 25 in a vehicle.

Accordingly, in the related art, a power conversion circuit for increasing the voltage of the battery 11 is provided in an energy storage device and a method of supplying voltage to the battery 25 in a vehicle through a DC charge pin after increasing the voltage of the battery 25 has been used. However, according to this method of the related art, since an energy storage device has a power conversion circuit for increasing voltage, there may be a problem for downsizing of the energy storage device and the price of the energy storage device may increase. Various exemplary embodiments of the present disclosure provide a technology that can charge a battery in a vehicle by providing the energy stored in a battery of an energy storage device to the battery in a vehicle which has higher voltage than the battery of the energy storage device without a power conversion circuit in the energy storage device.

The controller 13 of the energy storage device 10, according to an exemplary embodiment of the present disclosure, can provide a signal for recognizing a charge power source to the controller 27 in the vehicle 20 when the energy storage device 10 is connected to the vehicle 20 for charging. For example, the controller 13 can provide a signal for confirming that a charge power source is the battery 11 to the controller 27 in the vehicle 20 using a Control Pilot (CP) signal. This CP signal may be provided through a CP pin of the charging connector 15 (e.g., the pin No. 4 of the charging connector 15) that is coupled to the charging inlet 21 of the vehicle.

The charging connector 15 may be a part that provides a control signal for charging and charge power to the vehicle 20 by being coupled to the charging inlet 21 of the vehicle. The charging connector 15 may be a Society of Automotive Engineer (SAE) J1772 connector. The charging connector 15 shown in FIG. 1 is SAE J1772 combo connector that can be used in common for AC charge power and DC charge power of SAE J1772 connectors. That is, SAE J1772 combo connector is a standard connector designed to be used in common in two charge modes of slow charging that provides AC power to a vehicle and quick charging that provides DC power to a vehicle.

SAE J1772 combo connector includes an AC output pin (e.g., a pin No. 1 and a pin No. 2) for providing AC charge power in slow charging, a ground pin (e.g., a pin No. 3), a CP pin (e.g., a pin No. 4) to which a CP signal is provided, a Proximity Detection (PD) pin (e.g., a pin No. 5) for determining the connection state of the connector, and a DC plus (+) pin (e.g., a pin No. 6) and a DC minus (−) pin (e.g., a pin No. 7) for providing DC charge power in quick charging. The pins No. 6 and No. 7 for providing DC charge power can be used when the voltage of DC charge power provided to a vehicle from a charging facility or an energy storage device is voltage, which can charge the battery 25 that is the charge target, and the DC charge power can be directly applied to the battery 25 without an conversion process.

In the charging system according to an exemplary embodiment of the present disclosure, the energy storage device 10 may be configured to transmit DC power of the battery 11 using the pins Nos. 1 and 2 of the charging connector 15, that is, the pins provided to usually provide AC power in slow charging. In other words, in the energy storage device 10, two terminals (e.g., a plus terminal and minus terminal) of the battery 11 can be directly connected to the pins Nos. 1 and 2 of the charging connector 15, respectively. The pins Nos. 1 and 2 of the charging connector 15 can be connected to the input of an automotive on-board charger 23 through the charging inlet 21 of the vehicle 20.

The vehicle 20 may include: a charging inlet 21 to which the charging connector 15 of the energy storage device 10 is coupled; an automotive on-board charger (OBC) 23 producing and transmitting charge voltage for charging the battery 25 to the battery 25 by receiving external charge power from the a terminal No. 1 and a terminal No. 2 of the charging inlet 21; and a controller 27 determining the type of a charge power source, determines whether the charging connector 15 has been connected, and controls the operation of the OBC 23 in response to a CP signal and a PD signal from a terminal No. 4 and a terminal No. 5 of the charging inlet 21.

The charging inlet 21 may be a part that is exposed to outside of a vehicle and in which the charging connector 15 is inserted to be coupled, and may have terminals that are respectively connected to the pins of the charging connector 15. For example, the terminal No. 1 and the terminal No. 2 may be respectively connected with the pin No. 1 and pin No. 2 of the charging connector 15, whereby AC charge poser can be input in common slow charging. The terminal No. 1 and the terminal No. 2 may be connected to the input terminal of the OBC. Further, the terminal No. 3 of the charging inlet 21 may be provide chassis ground by being connected with the pin No. 3 of the charging connector 15, the terminal No. 4 may provide a CP signal to the controller 27 by being connected with the pin No. 4 of the charging connector 15, and the terminal No. 5 may provide a PD signal to the controller 27 by being connected with the pin No. 5 of the charging connector 15. Further, the terminal No. 6 and the terminal No. 7 of the charging inlet 21 may be respectively connected with the pin No. 6 and the pin No. 7 of the charging connector 15, whereby DC power provided to the pin No. 6 and the pin No. 7 may be provided directly to the battery 25.

The input terminal of the OBC 23 may be connected to the terminal No. 1 and the terminal No. 2 of the charging inlet 21. In general, the OBC 23 receives AC power from an external charging facility, converts the AC power into DC power having voltage that can charge the battery 25, and the provides the DC power to the battery 25. In an exemplary embodiment of the present disclosure, the OBC 23 can receive DC power through the terminal No. 1 and the terminal No. 2 of the charging inlet 21 from the battery 11, which supplies DC power in the external energy storage device 10, converts the DC power to a voltage level with desired magnitude, and provides the converted power to the battery 25.

The OBC 23 may include a power factor correction circuit 231 that is implemented as a topology of a boost converter, and a DC-DC converter 233 that converts output of the power factor correction circuit 231 to a voltage with magnitude suitable for charging the battery 25 and provides the voltage to the battery 25.

The battery 25, which may be a part storing energy for driving a motor (not shown) that provides torque to wheels of the vehicle 20, may have high-voltage output (e.g., about 400V or more) and may be charged with the DC charge power provided from the OBC 23.

When a connector for providing charge power from an external charging facility or energy storage device is coupled to the charging inlet 21, the controller 27 can sense it, recognize a power source providing charge power on the basis of a signal provided from the connector, and correspondingly appropriately control the OBC 23.

The controller 27 may be understood as a concept including all of various controllers that are usually disposed in a vehicle in association with charge control, for example, a Charge Management System (CMS), a Battery Management System (BMS), and an OBC controller.

The controller 27 of the vehicle according to an exemplary embodiment of the present disclosure may be a processor (e.g., computer, microprocessor, CPU, ASIC, circuitry, logic circuits etc.). The controller 27 may be implemented by a non-transitory memory storing, e.g., a program(s), software instructions reproducing algorithms, etc., which, when executed, controls operations of various components of the vehicle, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The operation, which is performed by the controller 27, of the charging system according to various exemplary embodiments of the present disclosure is described in more detail hereafter.

Figure 2:
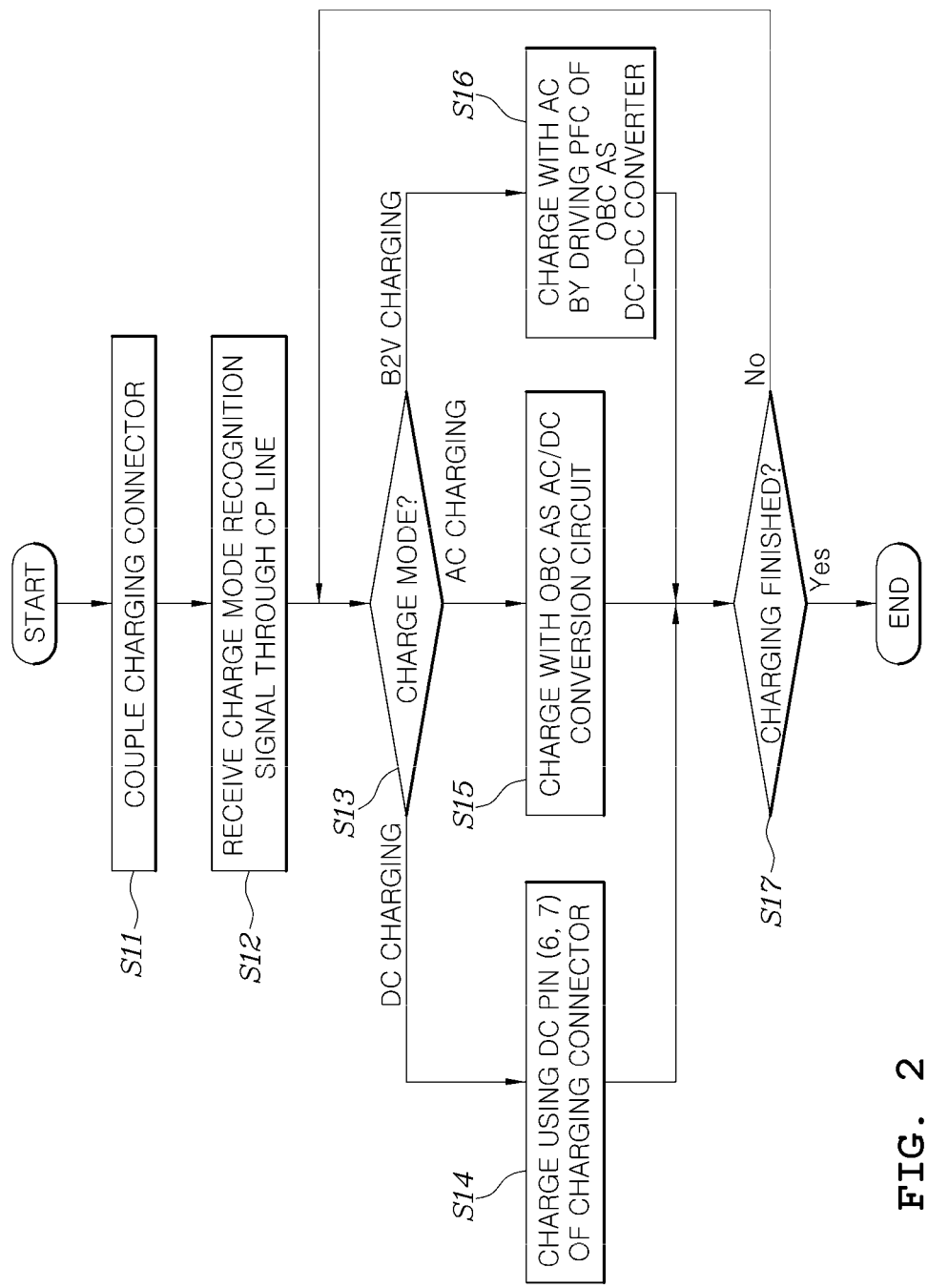
FIG. 2 is a flowchart showing a charge control method that is performed by a controller of a vehicle in a battery-to-vehicle charging system according to an exemplary embodiment of the present disclosure.
Figure 3:
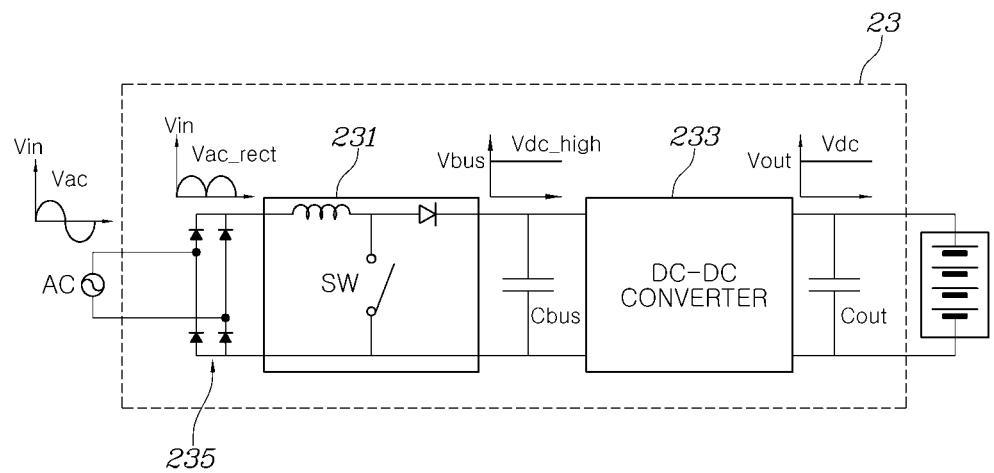
FIG. 3 is a diagram showing a circuit configuration and waveforms when external AC power is provided to an on-board charger from a battery-to-vehicle charging system according to an exemplary embodiment of the present disclosure.
Figure 4:
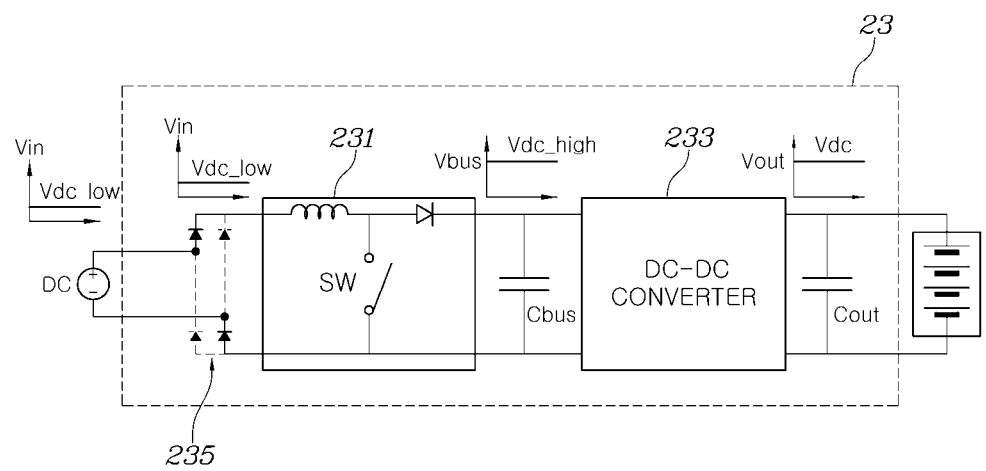
FIG. 4 is a diagram showing a circuit configuration and waveforms when external DC power is provided to an on-board charger from a battery-to-vehicle charging system according to an exemplary embodiment of the present disclosure.

FIG. 2 is a flowchart showing a charge control method that is performed by a controller of a vehicle in a battery-to-vehicle charging system according to an exemplary embodiment of the present disclosure. FIG. 3 is a diagram showing a circuit configuration and waveforms when external AC power is provided to an on-board charger from a battery-to-vehicle charging system according to an exemplary embodiment of the present disclosure, and FIG. 4 is a diagram showing a circuit configuration and waveforms when external DC power is provided to an on-board charger from a battery-to-vehicle charging system according to an exemplary embodiment of the present disclosure.

When the charging connector 15 is connected to the charging inlet 21 of the vehicle 20 (S11), the controller 27 may be provided with various control signals from an external charging facility (S12).

For example, when SAE J1772 is coupled to the charging inlet 21 in step S12, the controller 27 can receive a CP signal that is transmitted through a CP line formed by connecting the pin No. 4 of the charging connector 15 to the terminal No. 4 of the charging inlet 21 or a signal enabling to find out a charge mode through Power Line Communication (PLC). The charge mode means a control mode that is determined by finding out what type a charge power source providing charge power to a vehicle from the outside to charge the battery 25 is.

Next, the controller 27 can recognize the type of a power source that provides charge power to the battery 25 and determine a charge mode by recognizing the received signal (S13).

For example, in step S13, when receiving only a CP signal of a 1 kHz square wave having duty of 10-97% through a CP line, the controller 27 can determine that the external charge power source is a charging facility that provides AC power to the OBC 23. When receiving a power line communication signal through a CP line with a CP signal of a square wave of around 5% as a carrier, the controller 27 can find out whether a power source that provides low-voltage DC power to the OBC 23 through the terminal No. 1 and the terminal No. 2 of the charging inlet 21 has been connected or whether a charging facility that provides high-voltage DC power directly to the battery 25 through the terminal No. 6 and the terminal No. 7 has been connected, by recognizing the information of the power line communication signal. When charging is performed by a common DC charging facility and when charge power is determined as DC through communication using a power line communication signal between the controller 27 and a charging facility, the controller 27 deactivates the line that is connected with the terminal No. 1 and the terminal No. 2 of the charging connector 15 and activates the line that is connected with the terminal No. 6 and the terminal No. 7. According to an exemplary embodiment of the present disclosure, since DC power is supposed to be received through the terminal No. 1 and the terminal No. 2 through which AC charge power is input in the related art, it may be possible to receive and analyze a determination signal from the controller 13 of the energy storage device 10 through power line communication, and then activate the line that is connected with the terminal No. 1 and the terminal No. 2 and deactivate the line that is connected with the terminal No. 6 and the terminal No. 7.

As another example, in a common DC charging facility, when communication using a power line communication signal is performed between the controller 27 and a charging facility, a failure is determined when charge power is determined as DC, the line of the controller 27 that is connected with the terminal No. 6 and terminal No. 7 is activated, and then power is not supplied to the terminal No. 6 and the terminal No. 7. However, according to an exemplary embodiment of the present disclosure, DC power is supposed to be received through the terminal No. 1 and the terminal No. 2 to which AC charge power is input in the related art, when power is not supplied through the line that is connected with the activated terminal No. 6 and terminal No. 7, the controller 27 activates the line that is connected with the terminal No. 1 and the terminal No. 2 without determining a failure such that the external DC power can be received through the OBC 23 and the battery can be charged.

The PLC communication through a CP line may be a standard defined by SAE, which is not additionally described in detail.

Next, the controller 27 may perform suitable control for each of charge modes determined in accordance with the result of recognizing the types of power sources that provide charge power to the battery 25.

First, when the controller 27 determines an external charge power source is a charging facility that provides high-voltage DC power that can charge the battery 25, the controller can electrically connect the terminal No. 6 and terminal No. 7 of the charging inlet 21 to the battery 25 such that the high-voltage DC power provided to the terminal No. 6 and the terminal No. 7 of the charging connector 15 is provided directly to the battery 25 (S14). Electrical connection between the terminal No. 6 and the 7 of the charging inlet 21 and the battery 25 may be achieved by shorting a switching device such as a relay that is disposed therebetween. In this case, the controller 27 can cut the electrical connection between the battery 25 and the OBC 23 without operating the OBC 23 when there is provided an appropriate device for electrical connection/disconnection.

Next, when the controller 27 determines an external charge power source is a charging facility that provides AC power, the controller 27 can electrically connect the terminal No. 1 and the terminal No. 2 of the charging inlet 21 to the OBC 23 and appropriately control the OBC 23 such that the OBC 23 provides DC charge power to the battery 25 (S15). In step S15, the power factor correction circuit 231 in the OBC 23 operates as a circuit that not only improves the power factor of the input AC power, but converts rectified power into DC.

An example of an OBC that is controlled to operate by the controller 27 in step S15 is shown in FIG. 3.

The AC voltage that is applied by an external charging facility is rectified by a rectifier circuit 235 of the OBC 23 and then applied to the power factor correction circuit 231. The power factor correction circuit 231 may be implemented as a boost converter topology composed of an inductor L, a diode D, and a switching device SW. The controller 27 can control the switching duty of the switching device W by performing voltage control and current control such that the voltage Vbus of a bus capacitor Cbus at the output terminal of the power factor correction circuit 231 becomes a desired target voltage. A control method of the power factor correction circuit 231 implemented as a boost converter topology is well known in the art, so it is not additionally described in detail.

Next, the controller 27 can controls the DC-DC converter 233 to convert the magnitude of the bus terminal voltage Vbus into magnitude of voltage suitable for charging the battery 25. The DC-DC converter 233 can be implemented as various topologies in this field and can also be controlled by control methods well known in the art.

Next, when the controller 27 determines an external charge power source is an energy storage device 10 having a low-voltage battery 11, the controller 27 can electrically connect the terminal No. 1 and the terminal No. 2 of the charging inlet 21 to the OBC 23 and appropriately control the OBC 23 such that the OBC 23 provides charge power having a voltage of appropriate magnitude to the battery 25 (S16). In particular, in step S16, the controller 27 can control the power factor correction circuit 231 to operate as a simple boost converter.

An example of an OBC that is controlled to operate by the controller 27 in step S16 is shown in FIG. 3.

The DC voltage that is applied by an external low-voltage energy storage device 10 is applied to the rectifier circuit 235 of the OBC 23. By a diode connection state of the rectifier circuit 235, the rectifier circuit 235 performs only a function that transmits input DC voltage to the power factor correction circuit 231, not a function that rectifies AC voltage.

The controller 27 can determine the switching duty of the switching device SW in accordance with the ratio of the input voltage of the power factor correction circuit 231 and the target voltage to be output (i.e., the bus terminal voltage Vbus). It is very apparent in this field that the switching duty can be determined as the ratio of input voltage and predetermined target voltage in a boost converter composed of an inductor L, a diode D, and a switching device SW, so additional detailed description is not provided.

Next, the controller 27 can controls the DC-DC converter 233 to convert the magnitude of the bus terminal voltage Vbus into magnitude of voltage suitable for charging the battery 25. The DC-DC converter 233 can be implemented as various topologies in this field and can also be controlled by control methods well known in the art.

The controller 27 can always check the charge state of the battery 25 during charging, and can finish charging when the charge state of the battery 25 reaches a predetermined charge state (S17).

As described above, various exemplary embodiments of the present disclosure make it possible to charge a high-voltage battery in a vehicle from a low-voltage battery using a charging connector that has been used in the related art. In particular, even though there is no separate power conversion device for increasing voltage in an external energy storage device having a low-voltage battery, it is possible to perform charging by increasing the voltage of the low-voltage battery and then applying the voltage to the battery in a vehicle using a power factor correction circuit of an OBC mounted in the vehicle.

Accordingly, various exemplary embodiments of the present disclosure can make it possible to reduce the size and weight of an energy storage device for charging the battery in a vehicle, decrease the price of the energy storage device, and improve usability of the energy storage device.

For example, it is easy to carry an energy storage device in a vehicle in preparation for discharge of the battery in the vehicle, and it is easy to personally purchase or rent an energy storage device. Further, it is possible to charge the battery in a vehicle using the battery of an Energy Storage System (ESS) that is an existing power storage device. Further, it is possible to manufacture a simple energy storage device using a used battery, whereby it is possible to increase the remaining value of used batteries in accordance with expansion of the electric vehicle market.

Although the present disclosure was described above with reference to specific embodiments, it would be apparent to those skilled in the art that the present disclosure may be changed and modified in various ways within the claims.

What is claimed is:

1. A battery-to-vehicle charging system comprising:
   a charging inlet having a plurality of terminals to which a connector of an external charge power source is coupled, wherein the plurality of terminals has a power input terminal to which an alternative current (AC) charge power and a direct current (DC) charge power are alternatively applied from the connector and a signal terminal to which a control signal for charging is provided;
   an on-board charger including a power factor correction circuit that has an input terminal connected to the power input terminal of the charging inlet and has a boost converter topology;
   a battery that is charged with a charge voltage output from the on-board charger; and
   a controller determining a type of the charge power based on the control signal input from the external charge power source through the signal terminal of the charging inlet, and controlling a charge process based on the determined type of the charge power,
   wherein the controller controls the power factor correction circuit to operate as a boost converter when the determined type of the charge power is a DC power having a voltage lower than a voltage of the battery.

2. The system of claim 1, wherein the controller determines the type of the charge power based on the control signal input through a control pilot line formed by coupling the connector to the charging inlet.

3. The system of claim 1, wherein the controller receives a control signal in a power line communication through the control pilot line formed by coupling the connector to the charging inlet.

4. The system of claim 1, wherein the controller electrically connects the power input terminal to the battery without operating the on-board charger when the determined type of the charge power is a DC power having a voltage higher than the voltage of the battery.

5. The system of claim 1, wherein the power factor correction circuit has the boost converter topology including an inductor, a diode, and a switching device, and
   the controller determines a duty of the switching device based on a ratio of a voltage of the charge power source and a target voltage of an output terminal of the power factor correction circuit when the determined type of the charge power is a DC power of having a voltage lower than the voltage of the battery.

6. The system of claim 1, wherein the power factor correction circuit has a boost converter topology including an inductor, a diode, and a switching device, and
   the controller determines a duty of the switching device by performing a voltage control and a current control such that an output voltage of the power factor correction circuit becomes a target voltage when the determined type of the of the charge power is an AC power.

7. The system of claim 1, wherein the on-board charger further includes a DC converter that converts a magnitude of an output voltage of the boost converter into a predetermined magnitude of the charge voltage.

* * * * *